United States Patent
Hou et al.

(10) Patent No.: US 7,490,836 B2
(45) Date of Patent: Feb. 17, 2009

(54) PROGRESSIVE CONTROL FOR A FRONT SUSPENDED AXLE OF A VEHICLE

(75) Inventors: Yanming Hou, Pleasant Prairie, WI (US); Haibo Guo, Naperville, IL (US); James Thannikary, Aurora, IL (US)

(73) Assignee: CNH America LLC, New Holland, PA (US)

( * ) Notice: Subject to any disclaimer, the term of this patent is extended or adjusted under 35 U.S.C. 154(b) by 600 days.

(21) Appl. No.: 11/217,734

(22) Filed: Sep. 1, 2005

(65) Prior Publication Data

US 2007/0045971 A1 Mar. 1, 2007

(51) Int. Cl.
*B60G 17/048* (2006.01)
(52) U.S. Cl. .............. 280/5.515; 280/6.15; 280/6.153; 180/41
(58) Field of Classification Search ............. 280/5.515, 280/5.501, 5.513, 5.514, 5.5, 5.52, 6.15, 280/6.153, 6.159, 124.157, 124.16, 124.161; 180/41
See application file for complete search history.

(56) References Cited

U.S. PATENT DOCUMENTS

| | | | |
|---|---|---|---|
| 3,268,237 A * | 8/1966 | Van der Lely et al. .... | 280/43.18 |
| 3,450,418 A | 6/1969 | Rice ............................ | 280/489 |
| 4,279,319 A | 7/1981 | Joyce, Jr. ..................... | 180/12 |
| 4,696,365 A * | 9/1987 | Ishimori et al. ............. | 180/233 |
| 4,903,209 A | 2/1990 | Kaneko .................... | 364/424.5 |
| 5,042,834 A | 8/1991 | Yonekawa et al. .......... | 280/707 |
| 5,043,893 A | 8/1991 | Aburaya et al. ........ | 364/424.05 |
| 5,071,158 A | 12/1991 | Yonekawa et al. .......... | 280/707 |
| 5,088,761 A | 2/1992 | Takehara et al. ............ | 280/707 |
| 5,160,161 A | 11/1992 | Tsukamoto et al. ......... | 280/707 |
| 5,162,995 A | 11/1992 | Ikemoto et al. ........ | 364/424.05 |
| 5,342,023 A | 8/1994 | Kuriki et al. .................. | 701/37 |
| 6,394,238 B1 | 5/2002 | Rogala ..................... | 188/266.2 |
| 6,749,035 B2 | 6/2004 | Bundy ......................... | 180/41 |
| 2003/0015846 A1 | 1/2003 | Rogala et al. ............. | 280/5.514 |
| 2003/0047892 A1 | 3/2003 | Goddard ................... | 280/5.514 |
| 2004/0215380 A1 | 10/2004 | Song ............................ | 701/37 |

* cited by examiner

*Primary Examiner*—Eric Culbreth
(74) *Attorney, Agent, or Firm*—Patrick M. Sheldrake; John William Stader; Michael G. Harms

(57) ABSTRACT

The control includes a fluid system having a fluid passage in connection with a rod end chamber and a piston end chamber of a fluid cylinder connected to the front axle and a front end of a vehicle and extendible in length for increasing a distance between the front axle and the front end, a progressive control valve is disposed in the passage and is controllably movable through a range of progressively more restrictive partially open positions. The valve can also have a one-way flow position to allow fluid flow only from the piston end chamber to the rod end chamber, to allow only retraction of the cylinder. A controller is automatically operable for causing the valve to move through the range of progressively more restrictive partially open positions as the fluid cylinder is increasingly extended, and for moving the valve to the one-way flow position when the cylinder reaches a predetermined length. Operation of the control can be enabled by actuation of a drive for the front axle, such as mechanical front drive.

12 Claims, 5 Drawing Sheets

PROGRESSIVE CONTROL FOR A FRONT SUSPENDED AXLE OF A VEHICLE

TECHNICAL FIELD

The present invention relates to a suspension system for a vehicle such as a tractor or other work machine, and more particularly, to a control for a suspended front axle of such a machine that provides automatic progressive response to dynamic loading conditions such that a set travel limit of the suspension is not exceeded.

BACKGROUND ART

Heavy duty vehicles such as tractors and other work machines, can be subject to widely varying loads. When a relatively heavy load is applied to the rear end of the vehicle, such as when an implement or tool pulled through the ground by a tractor encounters soil conditions resulting in much increased drag, resulting in application of an increased downward force on rear wheels of the tractor, the front end of the tractor can be lifted as a result. If the tractor or other vehicle has a suspended axle, that is, the front end of the frame or body of the tractor or vehicle is connected to the front axle by a suspension, the front end can be lifted relative to the suspended axle, thereby increasing a distance therebetween. An effect of this is that the downward force applied against the ground by the front wheels can be decreased. This can be a particular problem when the front wheels are driving or powered, as the reduction of downward force will result in loss of front wheel traction.

Many tractors and other vehicles are known to have automatic load leveling and/or traction control systems which employ one or more hydraulic cylinders disposed between the suspended front axle and the frame of the vehicle. If the tractor or other vehicle has mechanical front drive (MFD), engagement of the MFD can cause the front wheels to generate traction force for pushing the vehicle forward. In operation, the front wheel traction force of MFD can produce a moment acting against the suspension system to swing it outward relative to a frame of the vehicle, and thereby cause the suspension cylinders to extend and the vehicle front end to rise. In a traction control mode, the cylinders are automatically extended by the system as required to ensure that a desired or required vehicle leveling and/or front traction is maintained. As a result, presence of a signal activating the MFD can serve to indicate the tendency of cylinder extension due to front traction. Additionally, the MFD signal can indicate possibility of dynamic load transfer conditions under heavy load that will tend to extend the cylinders.

Also, many such systems include fluid lines connecting the rod ends and piston ends of the cylinders in a typical regenerative circuit, which allow free fluid flow between the ends of the cylinders, for instance, when loading conditions which tend to urge the front end upwardly are encountered, such as when an implement or tool is being pulled through soil or other material resulting in high drag forces. This can be a problem, as the cylinders may fully extend, substantially reducing or eliminating the capability to extend more, and making retraction actions for absorbing shock loads less cushioned, resulting in a rougher ride. The system may also allow the cylinders to extend and increase the distance between the front end and the front axle, such that, as a result, the front end is raised, and the implement or tool is urged deeper into the ground, resulting in greater drag and increased forces urging the front end upwardly, which can cause still further extension of the cylinders in an attempt to increase or maintain front traction. The system can thus be caught in an undesirable loop, such that suspension performance is degraded and field work quality can deteriorate.

Thus, what is sought is an improved system and/or method of operation of a control for a suspended front axle which overcomes one or more of the problems and disadvantages set forth above.

SUMMARY OF THE INVENTION

What is disclosed is an improved control and method of operation thereof for a front suspended axle of a vehicle, which overcomes one or more of the problems and disadvantages set forth above.

According to a preferred aspect of the invention, the control includes at least one fluid cylinder connected between a front end of the vehicle and a front axle thereof, the fluid cylinder being extendible for increasing a distance between the front end and the front axle and retractable for decreasing the distance. The control includes a fluid system in connection with a rod end chamber of the fluid cylinder and a piston end chamber thereof, including a fluid passage therebetween. A progressive control valve is disposed in the passage and is variably controllable for moving from a fully open position through a range of progressively more flow restrictive partially open positions, and to a one-way flow position wherein fluid flow is allowed from the piston end chamber of the cylinder to the rod end chamber thereof, but not in the reverse direction. The control includes a sensor device operable for sensing information representative of a length of the cylinder and outputting a signal representative thereof. The control includes a controller in operative control of the progressive control valve, which is automatically operable when the front suspended axle is in an active mode, for controlling the valve to progressively limit fluid flow from the rod end chamber to the piston end chamber when the sensed lengths increase within a predetermined range of values, and for moving the valve to the one-way flow position when the sensed length of the cylinder reaches a predetermined value.

As a result, during operation, in the event a loading condition exists wherein the front end of the vehicle is urged upwardly relative to the front axle so as to urge the fluid cylinder to extend, as the cylinder responsively lengthens, the controller will operate to control the valve to move within the range of progressively more closed positions so as to provide progressively increasing resistance to further extension, while providing progressively less resistance to retraction of the cylinder, and so as to prevent extension beyond a predetermined upper limit when that limit is reached.

As an advantage, in the event a substantially large load is applied against a rear end of the vehicle, so as to urge the front end upwardly, the fluid cylinder or cylinders connected between the front end and front axle will not be extended beyond the predetermined length. The predetermined length is preferably less than the fully extended length, such that additional extension is available if conditions require, and the progressive increase in resistance to extension of the cylinder will provide normal or close to normal cushioning capabilities in the event shock loads are encountered.

DETAILED DESCRIPTION OF THE INVENTION

Figure 1:
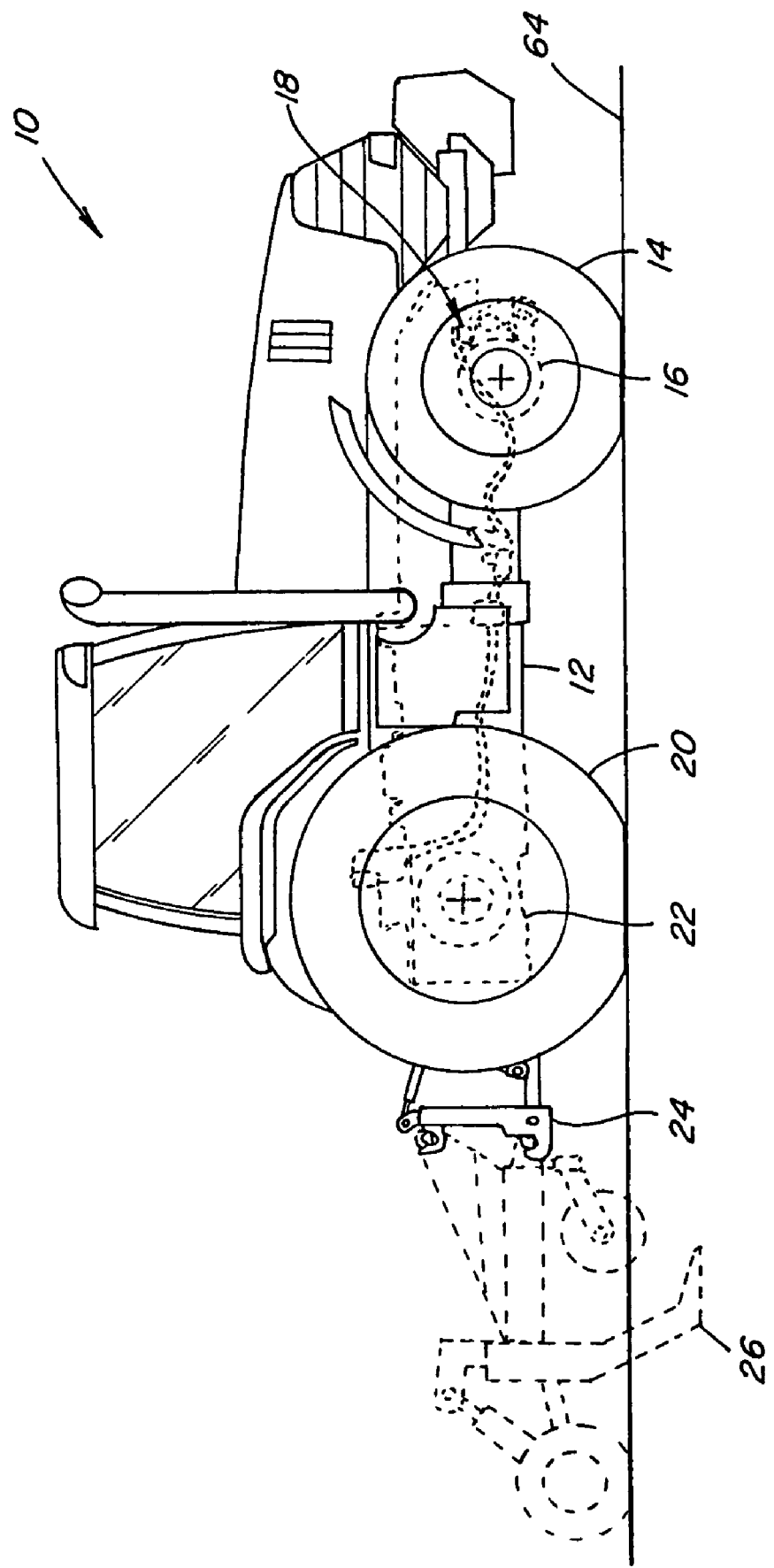
FIG. 1 is a simplified schematic side view of a tractor, including a suspended front axle and a progressive control therefore according to the present invention.

Referring now to the drawings, in FIG. 1, a tractor 10 is shown, including a frame 12, at least a pair of front wheels 14 in connection with a suspended front axle 16 operatively controllable by a progressive control 18 constructed and operable according to the teachings of the present invention. Tractor 10 additionally includes at least a pair of rear wheels 20 in connection with a rear axle and drive assembly 22, and a three point hitch 24, on which is mounted and illustrated in dotted lines, a conventionally constructed and operable subsoil ripper 26. Ripper 26 is pullable through the ground, for ripping apart root structures and breaking up compacted soil, for improving aeration and hydration of subsurface regions, for instance, for easing subsequent passage of implements such as discs and other tillage tools therethrough. Ripper 26 also has utility for movement through pavement and the like for breaking it up for ease of removal.

Figure 2:
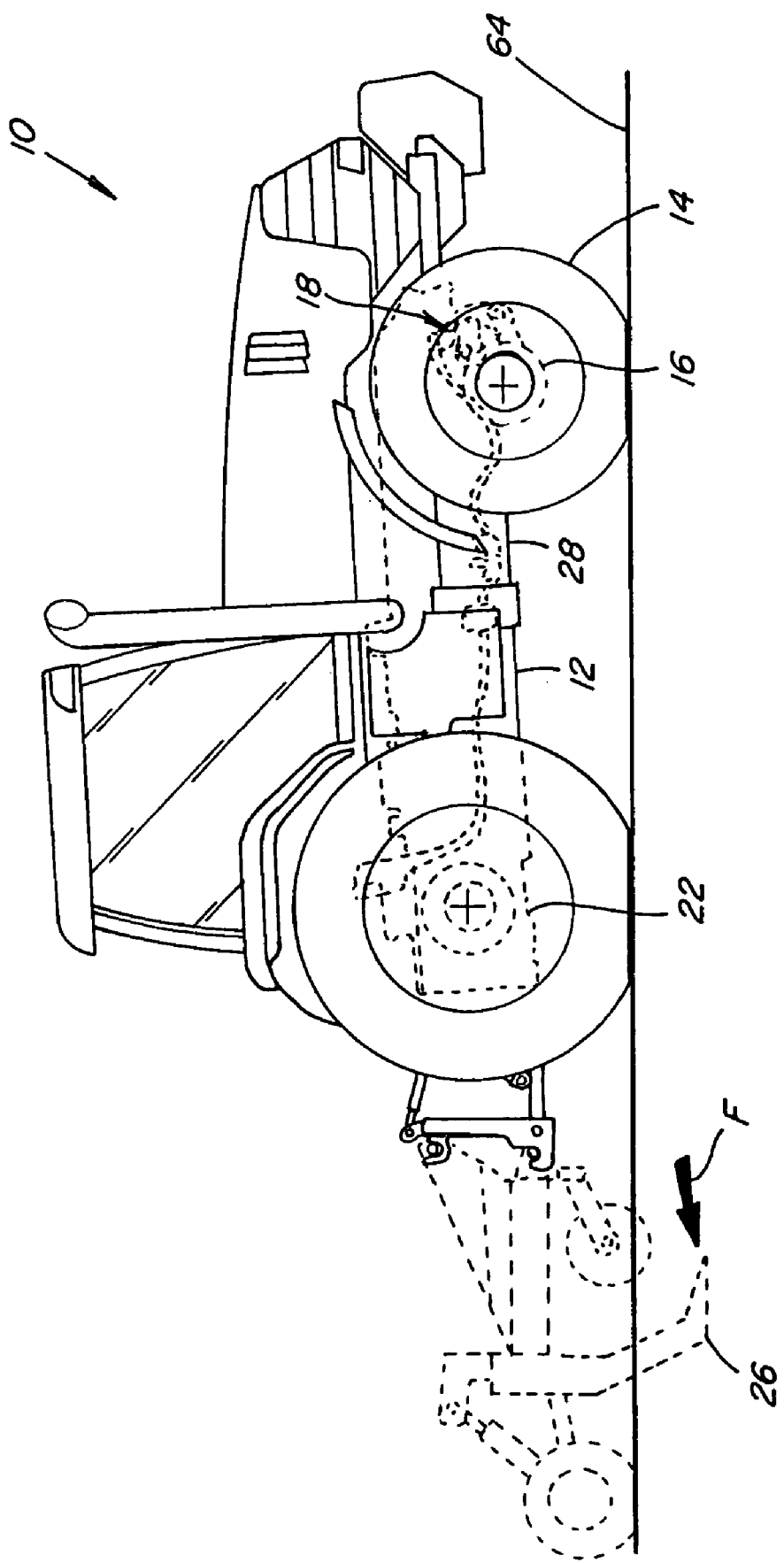
FIG. 2 is another simplified schematic side view of the tractor of FIG. 1, at an attitude wherein the front end of the tractor is raised relative to the suspended front axle as a result of a loading condition on a tool being towed on the rear end of the tractor.

Referring also to FIG. 2, tractor 10 is shown with forward movement of ripper 26 being opposed by a subterranean force F, such as can result from passage through particularly dense soil material such as heavily compacted clay, so as to translate into an increased downward loading on rear axle and drive assembly 22, and a raising of a front end 28 of frame 12 relative to front wheels 14 and suspended front axle 16.

Figure 3:
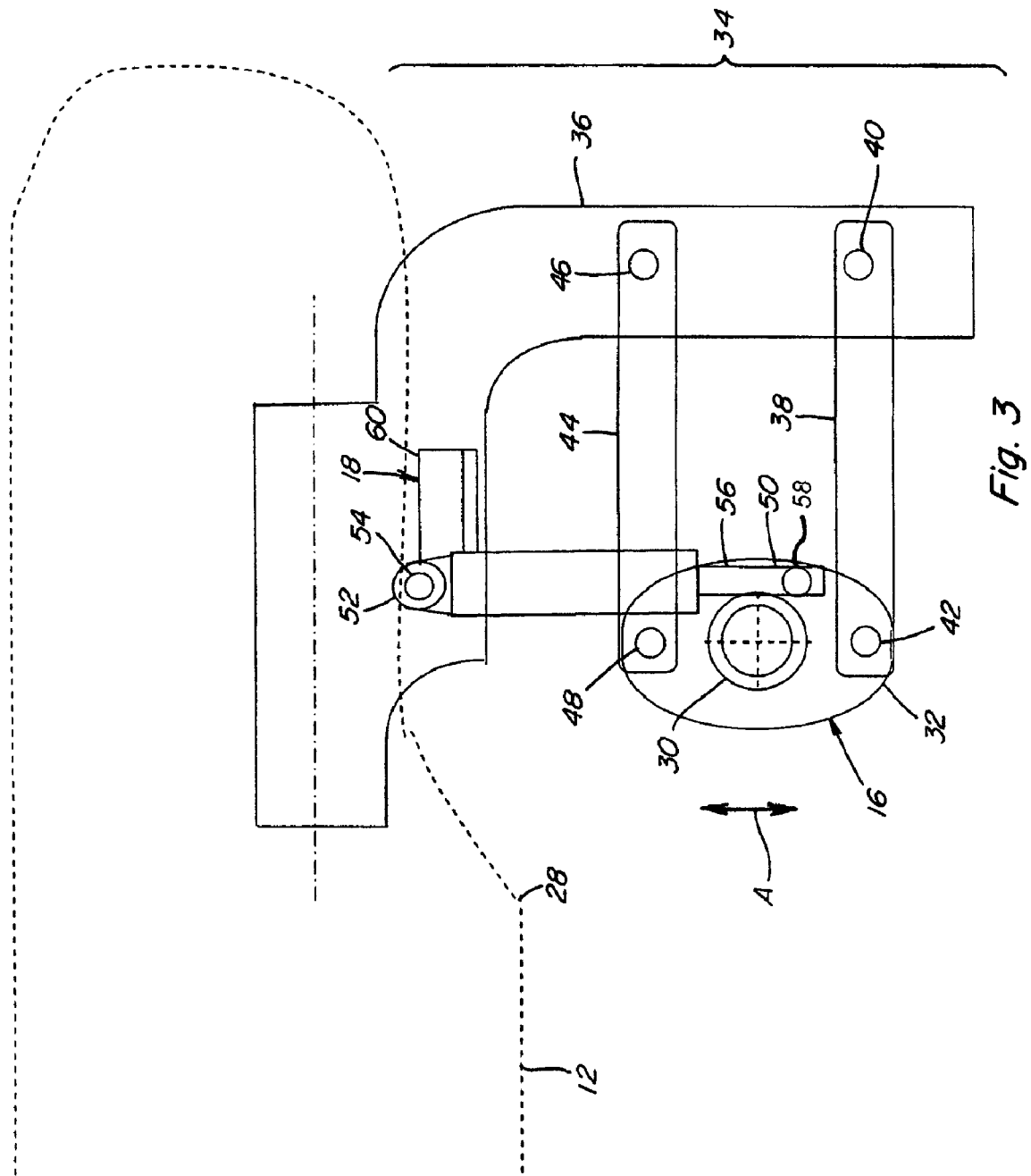
FIG. 3 is a simplified schematic side view of a suspended front axle of the tractor of FIG. 1.

Referring also to FIG. 3, an enlarged simplified side representation of suspended front axle 16 is shown, including a right front axle 30 connected in driving relation to one or more front wheels 14 (removed for clarity) on one side of tractor 10, axle 30 extending through a front axle housing 32. A left front axle is not shown. Front axle housing 32 is disposed beneath front end 28 of frame 12, and is connected thereto by a front suspension linkage assembly 34, including a main support bracket 36 fixedly mounted on and extending forwardly and downwardly from front end 28; a lower swing arm 38 pivotally connected by a pivot 40 to bracket 36, and by a pivot 42 to axle housing 32; and an upper swing arm 44 pivotally connected to bracket 36 by a pivot 46 and to axle housing 32 by a pivot 48. By virtue of the connections of front linkage assembly 34, front end 28 and front axle housing 32 are allowed to relatively pivotally move upwardly and downwardly, as denoted by arrow A.

The relative vertical distance between front axle housing 32 and front end 28 of frame 12 is controlled by a fluid cylinder 50. Fluid cylinder 50 includes a cylinder body 52 connected by a pivot 54 to front end 28, and a rod 56 connected by a pivot 58 to front axle housing 32. Cylinder 50 is extendible for increasing the vertical distance between front axle housing 32 and front end 28, and retractable for decreasing the distance. A progressive control valve 60 of progressive control 18 of the invention, is mounted to cylinder body 52, and is controllably operable by progressive control 18, as explained next in reference to FIGS. 4, 5, 6 and 7.

Figure 4:
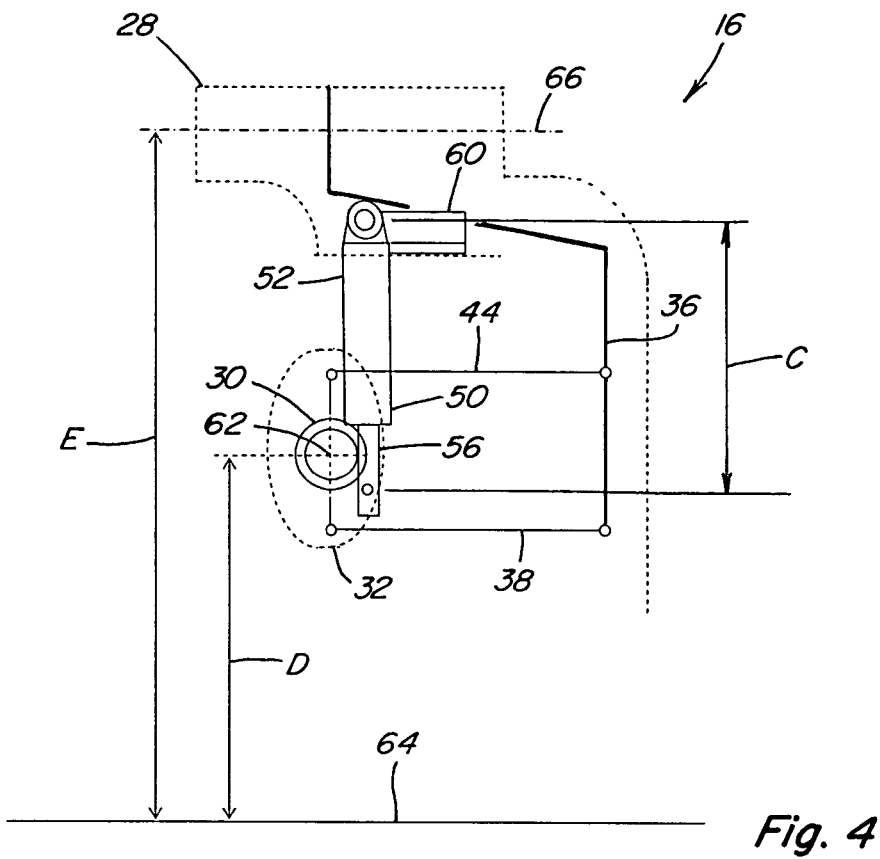
FIG. 4 is a simplified schematic diagrammatic representation of the front axle of FIG. 3.
Figure 5:
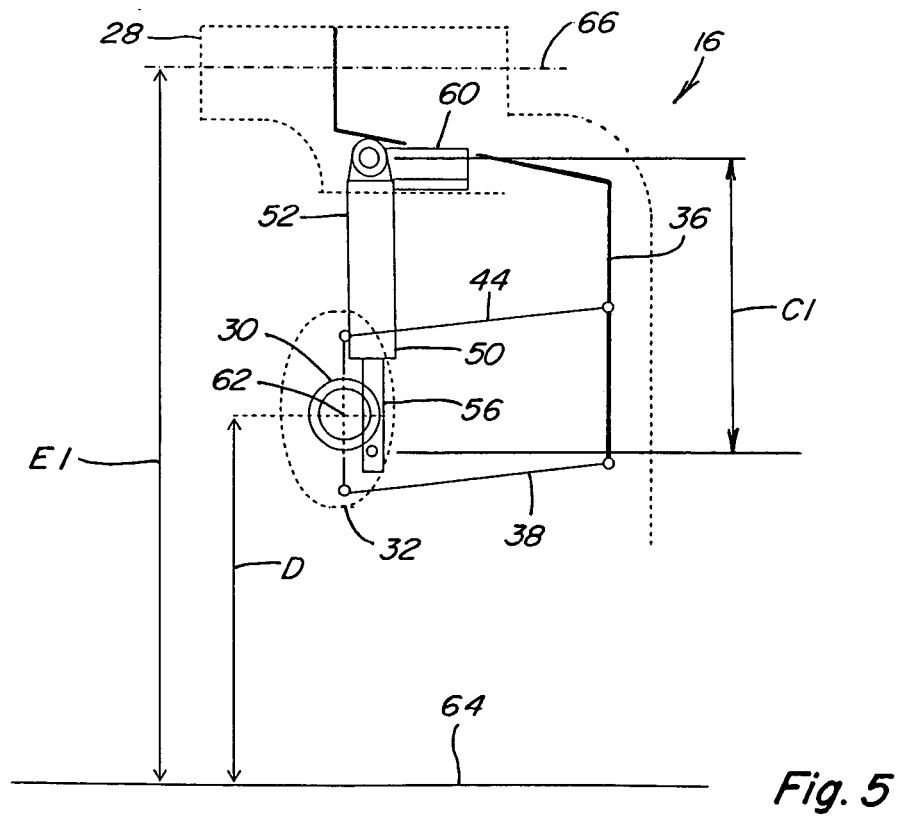
FIG. 5 is another simplified schematic diagrammatic representation of the front axle of FIG. 3.

Referring also to FIGS. 4 and 5, rod 56 of fluid cylinder 50 of suspended front axle 16 is shown extended from cylinder body 52 such that cylinder 50 has an overall length C, which can correspond to a relative position of frame 12 and front wheels 14 about as shown in FIG. 1. Bracket 36 and swing arms 38 and 44 are depicted schematically. With fluid cylinder 50 at length C, a rotational axis 62 of right front axle 30 is located a distance D above a ground surface 64 on which front wheels 14 rest (FIG. 1). A reference line 66 through a member of front end 28 of frame 12 is shown a distance E above ground surface 64.

In FIG. 5, rod 56 is shown further extended from cylinder body 52 of fluid cylinder 50, such that cylinder 50 of axle 16 now has an extended length C1, which can, for instance, correspond to a raised front end condition such as illustrated in FIG. 2. The pivotal positions of swing arms 38 and 44 about bracket 36 are illustrated schematically. With fluid cylinder 50 at this length, axis 62 of right front axle 30 is still located distance D above surface 64, but reference line 66 through front end 28 is located a distance E1 above surface 64, distance E1 being greater than distance E, and representing a greater distance between front axle housing 32 and front end 28, compared to that of FIG. 4. This would be representative of a typical cylinder length for which operation of progressive control 18 of the invention would be utilized, which is illustrated schematically in FIG. 6 and graphically in FIG. 7.

Figure 6:
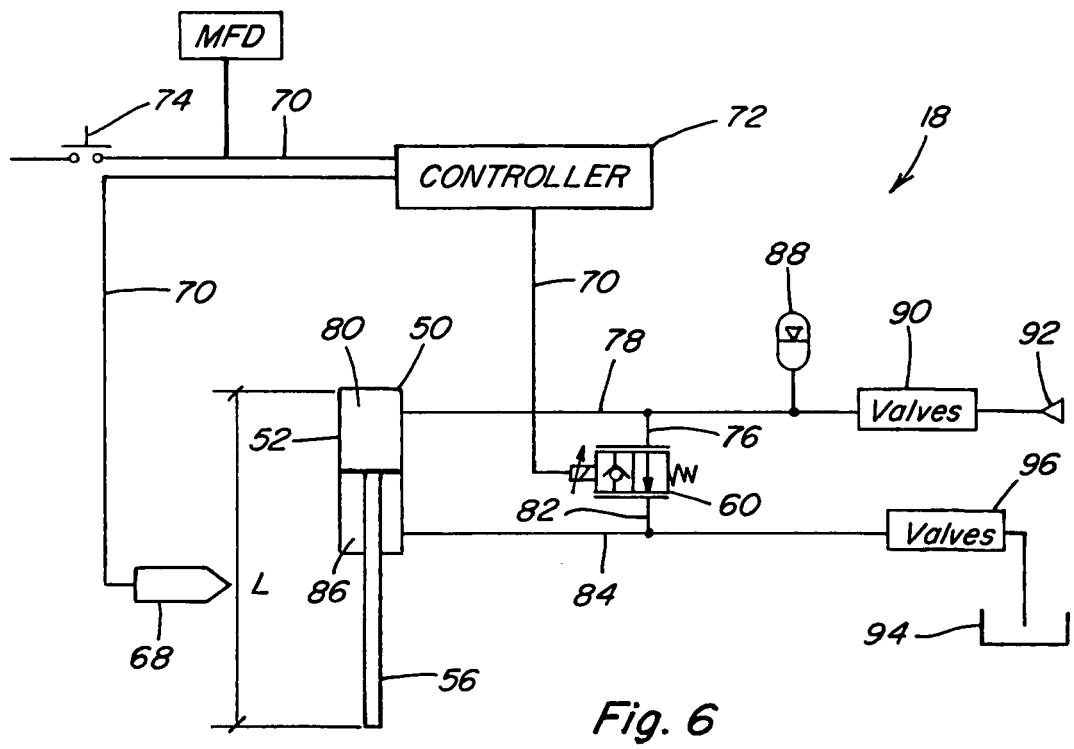
FIG. 6 is a simplified schematic representation of a fluid cylinder of the suspended front axle and circuitry of the progressive control of the invention.

Referring also to FIG. 6, rod 56 of fluid cylinder 50 is shown extended from cylinder body 52, such that cylinder 50 has an overall length L. The length of fluid cylinder 50 is sensed by a sensor 68, which can be a suitable commercially available sensor operable for sensing extension of a fluid cylinder, or a distance between two objects or locations, in the well known manner. Sensor 68 is shown connected by a conductive path 70 to a processor based controller 72 for outputting signals to controller 72 representative of the length of cylinder 50, including length L as shown. Controller 72 is also connected by a conductive path 70 to a switch 74 which will typically be located in an operator cab of tractor 10 and closeable for initiating mechanical front drive (MFD) in the well known manner, and simultaneously initiating operation of progressive control 18. Progressive control valve 60 is a commercially available variable displacement two-way valve, and is connected to controller 72 by a conductive path 70 for control thereby. Valve 60 has a first port 76 connected by a fluid line 78 to a piston end chamber 80 of fluid cylinder 50, and a second port 82 connected by a fluid line 84 to a rod end chamber 86 of cylinder 50. First port 76 of valve 60, line 78 and piston end chamber 80 additionally connect with a fluid accumulator 88, and through at least one valve, denoted at block 90, to a source of pressurized fluid, denoted at 92, such as a pump or the like. Second port 82 of valve 60, fluid line 84 and rod end port 86 are connected to a reservoir or tank 94 via one or more valves, denoted by block 96.

Progressive control valve 60 is conventionally variably modulated by signals or a voltage received over conductive path 70 from controller 72, for moving through a range of progressively more restrictive partially open positions, from a fully open position, to a one-way flow position wherein flow is allowed from first port 76 to second port 82, but not in the reverse direction. As a result, when valve 60 is modulated in its fully open position, free flow of fluid in either direction through lines 78 and 84 between piston end chamber 80 and rod end chamber 86 of cylinder 50 is allowed. When valve 60 is modulated within the range of partially open positions, flow between chambers 80 and 86 will still be allowed, but in a more restricted manner, depending on the amount the valve is open, which will be a function of the length of cylinder 50. And, when valve 60 is modulated in the one-way flow position so as to allow fluid flow only from port 76 to port 82, fluid will be allowed to flow from chamber 80 to chamber 86, but not in the reverse direction. At any time, fluid from chamber 80 can flow to accumulator 88 and valve or valves 90.

Figure 7:
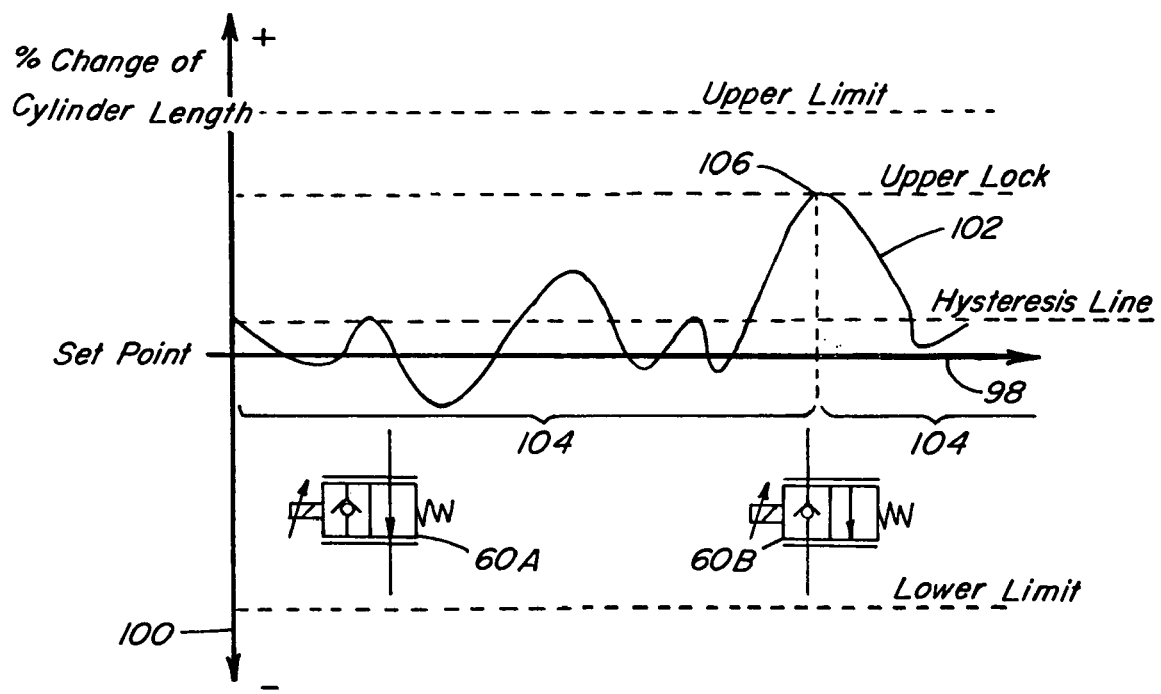
FIG. 7 is a graphical representation of cylinder lengths for the fluid cylinder of FIG. 6, and showing associated operating modes of a progressive control valve of the control of FIG. 6.

Referring also to FIG. 7, a graphical representation of operation of progressive control 18 is shown, a predetermined set point for a length L of cylinder 50 (FIG. 6) being denoted by horizontal axis 98, and changes in cylinder length being denoted along vertical axis 100, positive changes (increasing length) being denoted above axis 98, and negative changes (decreasing length) being noted below. A horizontal line identified by the connotation "upper limit", and a line connoted "lower limit" are shown equidistance above and below axis 98, respectively, and represent maximum and minimum values for percent change in the length of cylinder 50. Another horizontal line connoted "upper lock" is identified, and is selected as the value of an increase in length of cylinder 50, beyond which further extension will not be allowed by progressive control 18 when operational, that is, when switch 74 is closed. A line between axis 98 and the upper lock line, connoted "hysteresis line", serves to identify a percent of increase in cylinder length at which progressive control of fluid flow from rod end chamber 86 to piston end chamber 80 will be progressively controlled. A trace 102 of cylinder extension is shown extending from left to right along horizontal axis 98, and denotes a representative percent of change of cylinder length over a time interval. Progressive control valve 60 is schematically depicted at 60A modulated in the progressive control mode, that is, within a range of positions including a fully open position, and a range of progressively more restrictive positions, for cylinder lengths over ranges 104. Valve 60 is depicted at 60B in the one-way flow position allowing flow only from piston end chamber 80 to rod end chamber 86 when the upper lock limit is reached, as denoted at point 106.

Thus, it should be apparent from analysis of FIGS. 6 and 7 that progressive control 18 is automatically operable utilizing valve 60 in the progressive control mode denoted by 60A in FIG. 7 to progressively control extension of fluid cylinder 50 above the hysteresis line, and to automatically modulate to the one way position 60B to prevent further extension of cylinder 50 beyond the upper lock limit determined therefore.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A control for a suspended front axle of a vehicle, comprising:
    a fluid system including a fluid passage in connection with a rod end chamber and a piston end chamber of a fluid cylinder connected between the front axle and a front end of the vehicle and extendible in length for increasing a distance between the front axle and the front end, and a progressive control valve disposed in the passage and controllably movable through a range of progressively more restrictive partially open positions;
    a controller in operative control of the progressive control valve and automatically operable for causing the valve to move through the range of progressively more restrictive partially open positions as the fluid cylinder is increasingly extended; and
    wherein the progressive control valve is controllably movable to a one-way flow position wherein fluid flow is allowed therethrough only from the piston end chamber to the rod end chamber so as to allow the cylinder to retract, and the controller is automatically operable for causing the valve to move to the one-way flow position responsive to the fluid cylinder reaching a predetermined length.

2. The control of claim 1, wherein the controller is automatically operable for causing the valve to move from the one-way flow position to a partially open position responsive to the fluid cylinder decreasing in length from the predetermined length.

3. The control of claim 2, wherein the controller is automatically operable for causing the valve to move through a range of progressively less restrictive partially open positions as the cylinder is retracted from the predetermined length.

4. The control of claim 1, further comprising a sensor disposed and operable for sensing a length of the fluid cylinder and outputting information representative thereof to the controller.

5. The control of claim 1, wherein the controller is controlled by a switch operable for initiating operation of mechanical drive for the front axle.

6. A control for a suspended front axle of a vehicle, comprising:
    a fluid system including a fluid passage in connection with a rod end chamber and a piston end chamber of a fluid cylinder, the fluid cylinder being connected between the front axle and a front end of the vehicle and extendible in length for increasing a distance between the front axle and the front end, and a progressive control valve disposed in the passage of the fluid system and controllably movable through a range of progressively more restrictive partially open positions;
    a sensor disposed and operable for sensing a length of the fluid cylinder and outputting information representative thereof;
    a controller in connection with the sensor for receiving the information outputted thereby and in operative control of the progressive control valve and automatically operable for causing the valve to move through the range of progressively more restrictive partially open positions as the fluid cylinder is increasingly extended; and
    wherein the progressive control valve is controllably movable to a one-way flow position wherein fluid flow is allowed therethrough only from the piston end chamber to the rod end chamber so as to allow the cylinder to retract, and the controller is automatically operable for causing the valve to move to the one-way flow position responsive to the fluid cylinder reaching a predetermined length.

7. The control of claim 6, wherein operation of the control is initiated by operation of a switch for initiating operation of a drive for the front axle.

8. The control of claim 6, wherein the controller is automatically operable for causing the valve to move from the one-way flow position to a partially open position responsive to the fluid cylinder decreasing in length from the predetermined length.

9. The control of claim 8, wherein the controller is automatically operable for causing the valve to move through a range of progressively less restrictive partially open positions as the cylinder is retracted from the predetermined length.

10. A control for a suspended front axle of a vehicle, comprising:

a fluid system including a fluid passage in connection with a rod end chamber and a piston end chamber of a fluid cylinder, the fluid cylinder being connected between the front axle and a front end of the vehicle and extendible in length for increasing a distance between the front axle and the front end, and a progressive control valve disposed in the passage of the fluid system and controllably movable through a range of progressively more restrictive partially open positions and a one-way flow position wherein fluid flow is allowed therethrough only from the piston end chamber to the rod end chamber;

a sensor disposed and operable for sensing a length of the fluid cylinder and outputting information representative thereof; and a controller in connection with the sensor for receiving the information outputted thereby and in operative control of the progressive control valve and automatically operable for causing the valve to move through the range of progressively more restrictive partially open positions as the fluid cylinder is increasingly extended, and for moving the valve to the one-way flow position when the cylinder is extended to a predetermined length to prevent further extension thereof.

11. The control of claim 10, wherein operation of the control is initiated by operation of a switch for initiating operation of a drive for the front axle.

12. The control of claim 10, wherein the controller is automatically operable for causing the valve to move through a range of progressively less restrictive partially open positions as the cylinder is retracted from the predetermined length.

* * * * *